United States Patent
Wolfe et al.

(10) Patent No.: US 7,430,515 B1
(45) Date of Patent: Sep. 30, 2008

(54) SYSTEM AND METHOD FOR EXTERNALIZATION OF FORMULAS FOR ASSESSING DAMAGES

(75) Inventors: Brian Wolfe, Austin, TX (US); Allison W. Spann, Pflugerville, TX (US)

(73) Assignee: Computer Sciences Corporation, Austin, TX (US)

( * ) Notice: Subject to any disclaimer, the term of this patent is extended or adjusted under 35 U.S.C. 154(b) by 407 days.

(21) Appl. No.: 09/603,308

(22) Filed: Jun. 23, 2000

(51) Int. Cl.
*G06Q 40/00* (2006.01)

(52) U.S. Cl. .............................. 705/4; 706/47

(58) Field of Classification Search ............... 705/2, 705/3, 4, 1; 707/102
See application file for complete search history.

(56) References Cited

U.S. PATENT DOCUMENTS

| | | | |
|---|---|---|---|
| 4,553,206 A | 11/1985 | Smutek et al. | |
| 4,648,062 A | 3/1987 | Johnson et al. | |
| 4,812,966 A | 3/1989 | Takagi et al. | |
| 4,831,526 A | 5/1989 | Luchs et al. | |
| 4,837,693 A | 6/1989 | Schotz | |
| 4,839,822 A | 6/1989 | Dormond et al. | |
| 4,878,167 A | 10/1989 | Kapulka et al. | |
| 4,964,077 A | 10/1990 | Eisen et al. | |
| 4,975,840 A | 12/1990 | DeTore et al. | |
| 4,987,538 A | 1/1991 | Johnson et al. | |
| 4,992,972 A | 2/1991 | Brooks et al. | |
| 5,093,911 A | 3/1992 | Parks et al. | |
| 5,099,422 A | 3/1992 | Foresman et al. | |
| 5,155,806 A | 10/1992 | Hoeber et al. | |
| 5,157,768 A | 10/1992 | Hoeber et al. | |

(Continued)

FOREIGN PATENT DOCUMENTS

| | | |
|---|---|---|
| EP | 0 280 773 | 9/1988 |
| EP | 0 465 018 | 1/1992 |
| EP | 0 926 608 | 6/1999 |

OTHER PUBLICATIONS

Microsoft Press Computer Dictionary 2nd Edition, Microsoft Press, Redmond WA, 1994.

(Continued)

*Primary Examiner*—F. Zeender
*Assistant Examiner*—Vanel Frenel
(74) *Attorney, Agent, or Firm*—Meyertons, Hood, Kivlin, Kowert & Goetzel, P.C.; Eric B. Meyertons

(57) ABSTRACT

A method and system for externalization of formulas for assessing bodily injury general damages. An insurance company may use an expert system to develop a knowledge base in the form of business rules and formulas to process insurance claims. The business rules may execute the formulas to assist an insurance claims adjuster in assessing bodily injury general damages. The task of creation and maintenance of the formulas, used in calculating a trauma severity value, may be automated by the externalization of formulas. The user may create a formula data table and use a translator program to create a static instance of a formula class of objects for each row in the formula data table. The business rules may invoke the calculate method to execute the formulas. Changing the data stored in the formula data table and using the translator program to create a static instance of a formulas class of objects for each row, may accomplish updating and/or customizing the formulas.

59 Claims, 3 Drawing Sheets

U.S. PATENT DOCUMENTS

| | | | |
|---|---|---|---|
| 5,191,522 A | 3/1993 | Bosco et al. | |
| 5,201,044 A | 4/1993 | Frey, Jr. et al. | |
| 5,233,513 A | 8/1993 | Doyle | |
| 5,241,671 A | 8/1993 | Reed et al. | |
| 5,287,448 A | 2/1994 | Nicol et al. | |
| 5,307,262 A | 4/1994 | Ertel | |
| 5,307,265 A | 4/1994 | Winans | |
| 5,359,509 A | 10/1994 | Little et al. | |
| 5,386,566 A | 1/1995 | Hamanaka et al. | |
| 5,388,251 A | 2/1995 | Makino et al. | |
| 5,394,555 A | 2/1995 | Hunter et al. | |
| 5,432,904 A | 7/1995 | Wong | |
| 5,434,994 A | 7/1995 | Shaheen et al. | |
| 5,446,653 A | 8/1995 | Miller et al. | |
| 5,455,947 A | 10/1995 | Suzuki et al. | |
| 5,471,575 A | 11/1995 | Giansante | |
| 5,481,667 A | 1/1996 | Bieniek et al. | |
| 5,483,632 A | 1/1996 | Kuwamoto et al. | |
| 5,499,330 A | 3/1996 | Lucas et al. | |
| 5,504,674 A | 4/1996 | Chen et al. | 705/4 |
| 5,504,675 A | 4/1996 | Cragun et al. | |
| 5,517,405 A | 5/1996 | McAndrew et al. | |
| 5,523,942 A | 6/1996 | Tyler et al. | 705/4 |
| 5,535,323 A | 7/1996 | Miller et al. | |
| 5,537,315 A | 7/1996 | Mitcham | |
| 5,550,734 A | 8/1996 | Tarter et al. | |
| 5,550,976 A | 8/1996 | Henderson et al. | |
| 5,557,515 A | 9/1996 | Abbruzzese et al. | |
| 5,581,677 A | 12/1996 | Myers et al. | |
| 5,586,310 A | 12/1996 | Sharman | |
| 5,613,072 A * | 3/1997 | Hammond et al. | 705/4 |
| 5,638,508 A | 6/1997 | Kanai et al. | |
| 5,644,778 A | 7/1997 | Burks et al. | |
| 5,652,842 A | 7/1997 | Siegrist, Jr. et al. | |
| 5,655,085 A | 8/1997 | Ryan et al. | |
| 5,673,402 A | 9/1997 | Ryan et al. | |
| 5,689,706 A | 11/1997 | Rao et al. | |
| 5,704,044 A | 12/1997 | Tarter et al. | |
| 5,717,913 A | 2/1998 | Driscoll | |
| 5,732,221 A | 3/1998 | Feldon et al. | |
| 5,732,397 A | 3/1998 | DeTore et al. | |
| 5,745,901 A | 4/1998 | Entner et al. | |
| 5,748,953 A | 5/1998 | Mizutani et al. | |
| 5,768,505 A | 6/1998 | Gilchrist et al. | |
| 5,768,506 A | 6/1998 | Randell | |
| 5,768,578 A | 6/1998 | Kirk et al. | |
| 5,797,134 A | 8/1998 | McMillan et al. | |
| 5,806,078 A | 9/1998 | Hug et al. | |
| 5,809,478 A | 9/1998 | Greco et al. | |
| 5,809,496 A | 9/1998 | Byrd et al. | |
| 5,832,481 A | 11/1998 | Sheffield | |
| 5,832,530 A | 11/1998 | Paknad et al. | |
| 5,835,897 A | 11/1998 | Dang | |
| 5,835,914 A | 11/1998 | Brim | |
| 5,850,442 A | 12/1998 | Muftic | |
| 5,862,325 A | 1/1999 | Reed et al. | |
| 5,870,711 A | 2/1999 | Huffman | |
| 5,873,066 A | 2/1999 | Underwood et al. | |
| 5,877,757 A | 3/1999 | Baldwin et al. | |
| 5,884,274 A | 3/1999 | Walker et al. | |
| 5,895,461 A | 4/1999 | De La Huerga et al. | |
| 5,899,998 A | 5/1999 | McGauley et al. | |
| 5,903,873 A | 5/1999 | Peterson et al. | |
| 5,907,848 A | 5/1999 | Zaiken et al. | |
| 5,909,683 A | 6/1999 | Miginiac et al. | |
| 5,913,198 A | 6/1999 | Banks | |
| 5,914,714 A | 6/1999 | Brown | |
| 5,915,241 A * | 6/1999 | Giannini | 705/2 |
| 5,918,208 A | 6/1999 | Javitt | |
| 5,930,759 A | 7/1999 | Moore et al. | |
| 5,933,816 A | 8/1999 | Zeanah et al. | |
| 5,937,189 A | 8/1999 | Branson et al. | |
| 5,950,169 A | 9/1999 | Borghesi et al. | 705/4 |
| 5,950,196 A | 9/1999 | Pyreddy et al. | |
| 5,956,691 A | 9/1999 | Powers | |
| 5,963,952 A | 10/1999 | Smith | |
| 5,970,464 A | 10/1999 | Apte et al. | |
| 5,987,430 A | 11/1999 | Van Horne et al. | |
| 5,987,434 A | 11/1999 | Libman | |
| 5,991,733 A | 11/1999 | Aleia et al. | |
| 5,991,756 A | 11/1999 | Wu | |
| 5,995,947 A | 11/1999 | Fraser et al. | |
| 5,999,940 A | 12/1999 | Ranger | |
| 6,012,053 A | 1/2000 | Pant et al. | |
| 6,016,504 A | 1/2000 | Arnold et al. | |
| 6,029,150 A | 2/2000 | Kravitz | |
| 6,029,195 A | 2/2000 | Herz | |
| 6,038,393 A | 3/2000 | Iyengar et al. | |
| 6,038,668 A | 3/2000 | Chipman et al. | |
| 6,049,665 A | 4/2000 | Branson et al. | |
| 6,061,657 A | 5/2000 | Whiting-O'Keefe | |
| 6,064,983 A | 5/2000 | Koehler | |
| 6,065,000 A | 5/2000 | Jensen | |
| 6,065,047 A | 5/2000 | Carpenter et al. | |
| 6,073,104 A | 6/2000 | Field | |
| 6,081,832 A | 6/2000 | Gilchrist et al. | |
| 6,088,710 A | 7/2000 | Dreyer et al. | |
| 6,092,049 A | 7/2000 | Chislenko et al. | |
| 6,098,070 A * | 8/2000 | Maxwell | 707/102 |
| 6,105,007 A | 8/2000 | Norris | |
| 6,112,986 A | 9/2000 | Berger et al. | |
| 6,115,690 A | 9/2000 | Wong | |
| 6,119,093 A | 9/2000 | Walker et al. | |
| 6,128,598 A | 10/2000 | Walker et al. | |
| 6,134,582 A | 10/2000 | Kennedy | |
| 6,148,297 A | 11/2000 | Swor et al. | |
| 6,163,770 A | 12/2000 | Gamble et al. | |
| 6,185,540 B1 | 2/2001 | Schreitmueller et al. | |
| 6,202,054 B1 | 3/2001 | Lawlor et al. | |
| 6,208,973 B1 | 3/2001 | Boyer et al. | |
| 6,226,623 B1 | 5/2001 | Schein et al. | |
| 6,236,972 B1 | 5/2001 | Shkedy | |
| 6,236,975 B1 | 5/2001 | Boe et al. | |
| 6,237,035 B1 | 5/2001 | Himmel et al. | |
| 6,239,798 B1 | 5/2001 | Ludolph et al. | |
| 6,240,408 B1 | 5/2001 | Kaufman | |
| 6,266,645 B1 | 7/2001 | Simpson | |
| 6,272,471 B1 | 8/2001 | Segal | |
| 6,272,482 B1 * | 8/2001 | McKee et al. | 706/47 |
| 6,272,528 B1 | 8/2001 | Cullen et al. | |
| 6,301,621 B1 | 10/2001 | Haverstock et al. | |
| 6,314,415 B1 | 11/2001 | Mukherjee | |
| 6,314,419 B1 | 11/2001 | Faisal | |
| 6,330,551 B1 | 12/2001 | Burchetta et al. | |
| 6,336,096 B1 | 1/2002 | Jernberg | |
| 6,341,265 B1 | 1/2002 | Provost et al. | |
| 6,343,271 B1 | 1/2002 | Peterson et al. | |
| 6,370,511 B1 | 4/2002 | Dang | |
| 6,389,588 B1 | 5/2002 | Wadhwa et al. | |
| 6,401,079 B1 | 6/2002 | Kahn et al. | |
| 6,452,607 B1 | 9/2002 | Livingston | |
| 6,456,303 B1 | 9/2002 | Walden et al. | |
| 6,477,533 B2 | 11/2002 | Schiff et al. | |
| 6,480,956 B1 | 11/2002 | DiRienzo | |
| 6,484,178 B1 | 11/2002 | Bence, Jr. et al. | |
| 6,505,176 B2 | 1/2003 | DeFrancesco et al. | |
| 6,523,172 B1 | 2/2003 | Martinez-Guerra et al. | |
| 6,560,592 B1 | 5/2003 | Reid et al. | |
| 6,584,467 B1 | 6/2003 | Haught et al. | |
| 6,594,697 B1 | 7/2003 | Praitis et al. | |
| 6,681,380 B1 | 1/2004 | Britton et al. | |
| 6,775,658 B1 | 8/2004 | Zothner | |
| 2001/0009033 A1 | 7/2001 | Morisaki et al. | |
| 2002/0091818 A1 | 7/2002 | Cascio et al. | |

| | | |
|---|---|---|
| 2002/0116228 A1 | 8/2002 | Bauer et al. |
| 2002/0138449 A1 | 9/2002 | Kendall et al. |
| 2002/0198753 A1 | 12/2002 | Feldman et al. |
| 2003/0093302 A1 | 5/2003 | Quido et al. |
| 2003/0120477 A1 | 6/2003 | Kruk et al. |
| 2003/0158759 A1 | 8/2003 | Kannenberg |
| 2004/0030421 A1 | 2/2004 | Haley |

OTHER PUBLICATIONS

"High-Performance Communication Networks"; Jean Walrand and Pravin Varaiya; 1996; pp. 361-369; Morgan Kaufmann Publishers.
"Will your Business Model Float?"; Baatz, E.B.; Webmaster Magazine; Oct. 1996; http://www.cio.com/archive/webbusiness/100196_float_content.html.
"InsWeb Teams Up with Online Resources; Deal brings online insurance Marketplace to hundreds of financial institutions"; Dec. 2, 1998; pp. 1-3; Business Wire.
"Reliance Group providing On-Line Access to Workers' Comp, Auto, Surety, Professional Liability Coverages; E-Commerce to Exceed $100 Million in 1999"; Dec. 7, 1998; pp. 1-3; Business Wire.
Banking Flows Onto Net, Two Austin Software Companies Poised for Boom in Online Service; Ladendorf, Kirk; Dec. 14, 1998; pp. 1-5; Austin American Statesman.
"Time and Billing Gets Webbed"; Antoinette, Alexander; Jun. 1, 2000; pp. 46-50; Accounting Technology, vol. 16, No. 5.
Investigations into database management system support for expert system shells (vols. I and II) by Johnson, Verlyn Mark, Ph. D, University of Minnesota, 1993, Abstract.
Australian applcation—Examiner's report on patent application 2001268693, Apr. 21, 2006.
http://web.archive.org/web/20000605062238/http://www.wawanesa.com/insure_claims_process.htm. (Wawanesa Insurance) Jun. 5, 2000.
Allstate Creates New Customer Care Center Internet Service, Apr. 13, 1999, accessed at www.allstate.com/media/newsheadlines.
Allstate Announces Online Claim Reporting Capabillities, Sep. 13, 1999, accessed at www.allstate.com/media/newsheadlines.
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections to the Americas, vol. 1, No. 1, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
"The Continuum Company Announces Colossus™ Licenses," Continuum Financial News Release, The Continuum Company, Inc., Apr. 7, 1995, 1 page.
"The Continuum Company Announces Colossus License," Continuum Financial News Release, The Continuum Company, Inc., Jul. 13, 1995, 1 page.
"The Continuum Company Announces Colossus License," Continuum Financial News Release, The Continuum Company, Inc., Jul. 17, 1995, 1 page.
"The Continuum Company Announces Colossus™ Sale," Continuum Financial News Release, The Continuum Company, Inc., Oct. 9, 1995, 1 page.
"The Continuum Company Announces Colossus™ Sale To General Accident," Continuum Financial News Release, The Continuum Company, Inc., Nov. 7, 1995, 1 page.
"The Continuum Company Announces Second European Colossus Sale," Continuum Financial News Release, The Continuum Company, Inc., Jan. 5, 1996, 1 page.

"The Continuum Company Announces Colossus™ Sale," Continuum Financial News Release, The Continuum Company, Inc., Mar. 7, 1996, 1 page.

"The Continuum Company Announces Colossus License," Continuum Financial News Release, The Continuum Company, Inc., May 9, 1996, 2 pages.

"The Continuum Company Announces Colossus Sale," Continuum Financial News Release, The Continuum Company, Inc., Jun. 12, 1996, 2 pages.

"The Continuum Company Announces Colossus Sale," Continuum Financial News Release, The Continuum Company, Inc., Jul. 3, 1996, 1 page.

"CSC Continuum Announces Colossus Sale," News Release, Computer Sciences Corporation, Sep. 17, 1996, 2 pages.

"CSC Continuum Announces Colossus License," News Release, Computer Sciences Corporation, Sep. 17, 1996, 2 pages.

"CSC Continuum Announces Colossus™ License," News Release, CSC Continuum, Nov. 21, 1996, 2 pages.

"USAA Licenses Colossus™," News Release, CSC Continuum, Feb. 10, 1997, 2 pages.

"20th Century Industries Licenses Colossus™," News Release, CSC Continuum, Feb. 10, 1997, 2 pages.

"Arrow Claims Management Licenses Colossus™," News Release, Computer Sciences Corporation, Aug. 6, 1997, 2 pages.

"American Family Insurance Renews Colossus™ License," News Release, Computer Sciences Corporation, Dec. 8, 1997, 2 pages.

"Explorer Insurance Company Licenses Colossus™," News Release, Computer Sciences Corporation, Dec. 8, 1997, 2 pages.

Greenleaf, Graham, A Colossus come to judgement: GIO's expert system on general damages, University of New South Wales (published in the Law & Information Technology column, Australian Law Journal) Nov. 26, 1992, 6 pages.

Beinat, Paul, Artificial intelligence helps boost Australian profits, Property-Casualty Insurance Edition Apr. 1997, vol. 97, Issue 12, p. 22, 2/3 p.

Attrino, Tony, Software helps bolster claims assessment, National Underwriter/ Property & Casualty Risk & Benefits, May 4, 1998, vol. 102, Issue 18, p. 14, 2p.

Colossus'—A claims management system, creates standard for measuring pain/ sufering claims, Insurance Advocate, May 8, 1999, vol. 110, Issue 19, p. 25, 1/4 p.

Schwartz, Susana, CSC wraps traditional insurance solutions into a neat new package, Insurance and Technology, Sep. 1998, vol. 23, Issue 9, p. 61, 2p.

Bremer, Christine, and Lance Trollop, Colossus: What Colossus is and what it does, accessed at http://www.watl.org.Verdict%20articles/colossus.htm on May 6, 2004.

Scopus and Entrust: Call Center Sales Helper is Unveiled, Nov. 10, 1997; vol. 162, Issue 217, p. 19.

International search report application No. PCT/US 01/ 20030, mailed Nov. 1, 2001, 5 pages.

"@ Fault A Commitment to Consistency," Computer Sciences Corporation, Copyright 2000, pp. 1-2.

Borland, Russel; "Running Microsoft Outlook 97," Microsoft Press, 1997.

Howarth, "Outsourcing: Technology on Tap," Business Review Weekly, Dec. 1999, pp. 1-5.

"The OTC Revolution"; Juhl, Randy; Mar. 3, 1997; Drug Topics 141 (5).

Mead, Jay, "Measuring the Value Added by Technical Documentation" Technical Communication Online, Aug. 1998, V. 45, N. 3.

Medisoft Insurance Claims Software Website. May 10, 2000. [Retrieved on Jan. 10, 2003] Retrieved from Interne URL: <http://web.archive.org/web/20000510094549/http://www.medisoft.com/>.

Merlin, Jr., William F., "Collision Course With the Colossus Program: How To Deal With It," The Merlin Law Group, May 2000, Tampa, FL, pp. 1-17.

Merlin, Jr., William F., "Overcoming Allstate's Trade Secrets and Work-Product Objections," The Merlin Law Group, May 2000, Tampa, FL, pp. 1-31.

Microsoft Corporation, "Holding State in Objects with Microsoft Transaction Server," Jun. 1997, pp. 1-3.

Microsoft Corporation, "Microsoft Component Services, Server Operating System, A Technology Overview," Aug. 15, 1998, pp. 1-7.

Scopus and Entrust Technologies to Deliver World's First Secure Customer Care Solution for the Financial Service Market; PR Newswire dated Nov. 5, 1997.

Utzschneider, "Microsoft Transaction Server and Internet Information Server: Technology for the Web," Feb. 6, 1998, pp. 1-6.

Merlin, Jr., William F., "Colossus: What We Know Today," The Merlin Law Group, Aug. 2000, Tampa, FL, pp. 1-8.

https://www.foremost.com/secure/fm_claims.htm 1996.

Summary of Colossus Functionality as of Dec. 1999.

Johnson, Verlyn Mark, Ph. D, Investigations into database management system support for expert system shells (vols. I and II) by University of Minnesota, 1993, Abstract.

* cited by examiner

| FormulaID | SequenceNo | Operation | Value |
|---|---|---|---|
| FID000 | 1 | * | 100 |
| FID000 | 2 | > | 500 |
| FID000 | 3 | - | 1200 |
| FID001 | 1 | + | 50 |
| FIDNNN | 1 | * | 5 |
| FIDNNN | 2 | => | 1000 |

SYSTEM AND METHOD FOR EXTERNALIZATION OF FORMULAS FOR ASSESSING DAMAGES

BACKGROUND OF THE INVENTION

1. Field of the Invention

The present invention generally relates to the field of insurance claims. More particularly, the present invention relates to a system and method for externalization of formulas for assessing bodily injury general damages.

2. Description of the Related Art

Insurance companies have been processing and settling claims associated with bodily injury for a long time. The task of evaluating, analyzing or estimating the amount of damage associated with one or more types of bodily injuries, especially trauma-induced bodily injuries, can be very complex. Complexity in the evaluation process often arises out of the fact that concurrent expertise in legal, medical and insurance fields is often required to arrive at a particular decision involving a bodily injury claim.

Several factors can affect the estimated amount of the claim associated with a bodily injury. Every accident is different and every injury is unique. Arriving at a customized evaluation of a bodily injury claim, which is unique for a specific accident, injury, etc. is desirable. Applying across-the-board standards may tend to result in an inequitable solution for one or more parties involved. External environmental factors, such as the experience level of a claims adjuster, record of accomplishment of the legal professionals, post-injury quality of life for the injured party, etc., all can affect the valuation of a claim.

During the past several years, many insurance companies have been using computer-based and knowledge-based claim-processing systems to process, evaluate, analyze and estimate thousands of claims in a fair and consistent manner. A knowledge-based claim-processing system includes an expert system which utilizes and builds a knowledge base to assist the user in decision making. It may allow the insurance companies to define new rules and/or use previously defined rules, in real-time. The business rules are generally written by industry experts to evaluate legal, medical, insurance conditions before arriving at a valuation of a claim.

There were several drawbacks with the prior art knowledge-based system. For example, the formulas used in the prior art, lacked flexibility. The formulas used in the calculation of trauma severity values were often hard-coded in the insurance claim processing software. Every time there was a new business requirement or a trauma severity calculation needed to be changed, it was often necessary to change the source code. In some cases the need to change the source code often resulted in delaying the incorporation of the updated and/or new formulas until the next system release date. Thus the insurance claim processing software was unable to adapt quickly to changing business conditions. This reduced the users' and therefore the insurance companies' flexibility to respond to changing business conditions in assessing bodily injury claims.

Very often, the user may have special or unique requirement, which may required that the standard formulas be modified or customized to meet a specific application. For example, different zones or geographic areas in the United States may have different monetary values associated with trauma severity for the same type of injury. The hard-coding method to compute formulas, used in the previous approaches, may not easily permit the customization of the formulas in a cost and time effective manner.

It is, therefore, desirable to develop a new system and method for externalization of formulas for assessing bodily injury general damages. It is desirable for the formulas to be easily updateable in response to changing external business conditions. It is also desirable for the formulas to be customizable to meet specific user requirements. Thus, the new system and method for externalization of formulas should be of a flexible design, to meet unique user requirements.

SUMMARY OF THE INVENTION

The present invention provides various embodiments of a system and method for externalization of formulas to assess bodily injury general damages. In one embodiment, an insurance company may use an expert system to develop a knowledge base in the form of business rules and formulas to process insurance claims. In one embodiment, the formulas may be invoked by the business rules to calculate trauma severity values associated with a bodily injury insurance claim. A rules engine may execute the business rules and formulas.

The task of creation and maintenance of the business formulas, used by the business rules in the assessment of claims, may be automated by the externalization of formulas. In one embodiment, the database, which is external to the rules engine, may store all business rules, formulas, program instructions, data, tables, objects, etc. associated with the processing of insurance claims. In one embodiment, the database may be an object oriented or a relational database. In one embodiment, the database may include a plurality of knowledge bases often storing knowledge data in the form of tables. The data stored in the knowledge bases may also be in the form of objects. The user may create a formulas data table, which is an embodiment of a knowledge base and which includes data necessary to transform the formula data to formulas. The entire set of formulas created to process insurance claims may be classified into a plurality of formula types. In one embodiment, a formula type may include a mathematical function operating on one or more inputs to compute one or more outputs. In one embodiment, new formula types may be created and added to existing formula types to customize the formulas.

The transformation program, in one embodiment, reads each row of the formula data table and creates a static instance of an object in the formula class in a separate knowledge base named formulas. Business rules may invoke the static instance of formula using the calculate method. In one embodiment, the calculate method gathers all of the static instances with a specified FormulaID along with a sequence number. The calculate method then interprets the operations and controls how the formula is executed. The resulting output value may be used to calculate the trauma severity value.

By changing or modifying the data stored in the formulas data table and using the transformation method it may be possible to update the business formulas. Changing or adding new entries to the formulas types may customize the formulas.

Figure 1A:
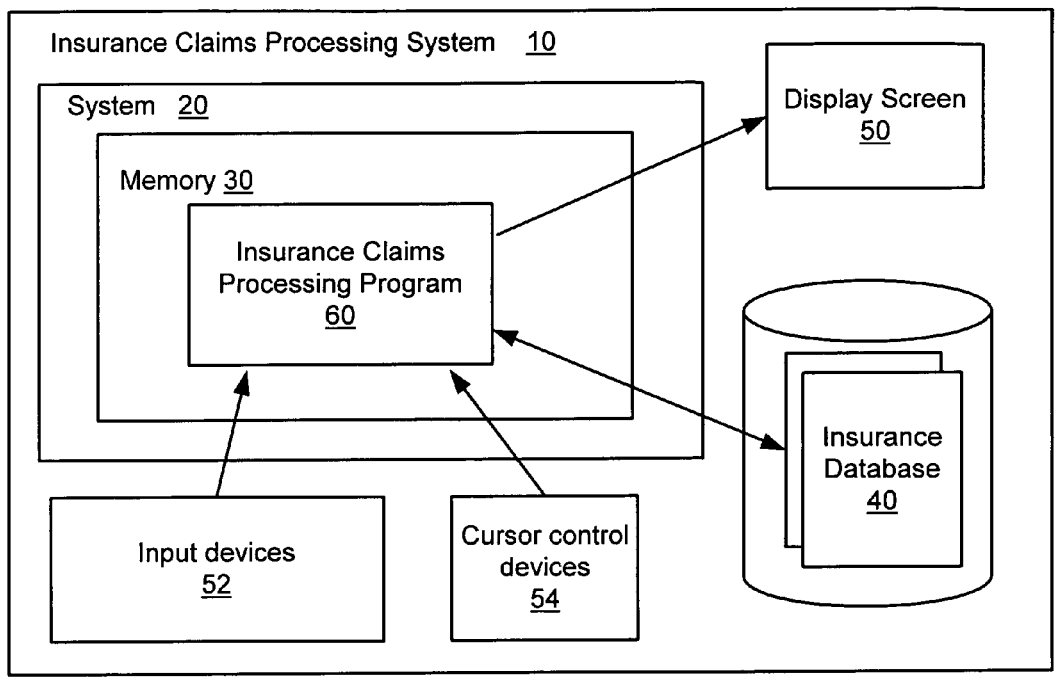
FIG. 1a is a block diagram illustrating the architecture of one embodiment of an insurance claims processing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims.

DETAILED DESCRIPTION OF SEVERAL EMBODIMENTS

FIG. 1a: A Block Diagram Illustrating the Architecture of One Embodiment of an Insurance Claims Processing System In FIG. 1a, an embodiment of an insurance claims processing system 10 may include a computer system 20. The term "computer system" as used herein generally includes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory" is used synonymously with "memory medium" herein. The term "memory medium" is intended to include an installation medium, e.g., a CD-ROM, or floppy disks, a volatile computer system memory such as DRAM, SRAM, EDO RAM, Rambus RAM, etc., or a non-volatile memory such as optical storage or a magnetic medium, e.g., a hard drive. The memory medium may comprise other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution. Also, the computer system may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium.

The memory medium preferably stores a software program or programs for processing insurance claims as described herein. The software program(s) may be implemented in any of various ways, including procedure-based techniques, component-based techniques, and/or object-oriented techniques, among others. For example, the software programs may be implemented using a rule-based development tool such as PLATINUM Aion™ available from Computer Associates International, Inc. In one embodiment, PLATINUM Aion™ may combine business rule and object-oriented technologies to create and maintain complex, knowledge-intensive applications. Software developed with PLATINUM Aion™ may employ an Aion™ programming language for automation of processes which may use hundreds or thousands of business rules from a knowledge base. An Aion™ inference engine may automatically determine which rules to execute, when, and in what order. In various other embodiments, the software program may be implemented using other technologies, languages, or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory, as the data is required by a program.

A server may be defined as a computer program that, when executed, provides services to other computer programs executing in the same or other computer systems. The computer system on which a server program is executing may also be referred to as a server, though it may contain a number of server and client programs. In the client/server model, a server is a program that awaits and fulfills requests from client programs in the same or other computer systems.

The insurance claims processing system 10 may further include a display screen 50 connected to the computer system 20 and an insurance database 40 residing on an internal or external storage. The database may also be referred to as a repository. As used herein, a "database" may include a collection of information from which a computer program may select a desired piece of data. As used herein, an "insurance database" is used as a synonym for a "database" when included in or coupled to an insurance claims processing system 10. System 20 includes memory 30 configured to store computer programs for execution on system 20, and a central processing unit (not shown) configured to execute instructions of computer programs residing on system 20. Claims processing program 60, also referred to as application program software 60, may be stored in memory 30. As used herein, an "insurance claims processing program" 60 may include a software program which is configured to conduct transactions regarding insurance claims, such as by estimating the value of the insurance claims, for example.

The insurance claims processing system 10 may be used by an Insurance Company for various embodiments of a system and method for externalization of formulas for assessing bodily injury general damages associated with a bodily injury insurance claim. As used herein, an Insurance Company (IC) includes a business organization that provides insurance products and/or services to customers. More particularly, the insurance products may pertain to providing insurance coverage for accidents and the trauma-induced bodily injuries that may result due to the accident. Examples of trauma-induced bodily injuries may include, but are not limited to: loss of limb(s); bone fractures; head, neck and/or spinal injury, etc.

In one embodiment, on receiving a trauma-induced bodily injury, a customer may file an insurance claim with his/her insurance organization to cover medical and other accident-related expenses. An IC may utilize a computer-based insurance claim processing system to process insurance claims. In one embodiment, the processing may include estimating a financial value associated with the filed insurance claim. The calculation of the estimated financial value may be based on the use of formulas to calculate a trauma severity value associated with the bodily injury insurance claim. The formulas may utilize pre-defined, custom algorithms to calculate the trauma severity value.

As used herein, an IC business transaction may be defined as a service of an IC. Examples of business transactions include, but are not limited to: insurance transactions such as filing of claims, payment of claims, application for insurance coverage, and customized benefits, etc. Business transactions may also include services related to customers, insurance providers, employers, insurance agents, investigators, etc.

As used herein, an IC insurance claim processing includes a series of instructions executed by a computer system for processing an IC's business transactions. A claim processing system may include one or more processing tasks. A processing task may include a sequence of one or more processing steps or an ordered list or a structured list of one or more processing steps, associated with the business transaction to be processed by the claim processing system. In one embodiment, the sequence of steps may be fixed. In another embodiment the sequence of steps may be established dynamically, in real-time. In one embodiment, the sequence of one or more steps may include an initial step, a final step, one or more intermediary steps, etc. In one embodiment, an IC user may select steps to process an insurance claim in a sequential manner. In another embodiment, the IC user may select steps to process an insurance claim in a random or arbitrary manner. Examples of processing steps may include, but are not limited to: receiving an input from a user of the IC insurance claim processing system, reading a value from a database, calculating a value using a formula, updating a field in a database, displaying the results of a business transaction on a computer screen, etc.

In one embodiment, the insurance claim processing system may execute business rules in the form of program instructions in response to completion of certain steps, events, user inputs, etc. and as part of processing of the insurance claim. The rules may execute or invoke formulas to compute trauma severity values used in insurance claim processing. The execution of the rules may result in one or more actions such as selection of the next step, performing additional calculations, generating an error message, waiting for user input, etc. The specific number or type of rules executed will vary depending on the type of injuries, the type of treatments, etc. specified in the bodily injury damages claim.

In one embodiment, the insurance claim processing system utilizes object-oriented technology to process insurance claims and assess bodily injury damages. In another embodiment, processing of insurance claims may utilize traditional programming languages and data bases to achieve the same result. Insurance objects may be defined to represent or model real-world business features of insurance products and services. Examples of insurance objects may include, but are not limited to, objects representing the following: an insurance claim; an accident report; a settlement; an estimated claim; IC service facilities, customers, and employees; business process such as a new insurance application and a formula for the calculation of a premium; interfaces to external insurance organizations; work tasks such as calculations, decisions, and assignments; temporal objects such as calendars, schedulers, and timers; and elemental data necessary to accomplish work tasks such as medical costs, risk factors, etc.

An insurance object may be represented on the computer screen by a graphical icon or by a display listing the properties of the insurance object in graphic and alphanumeric format.

An insurance claim object may be configured to gather and evaluate data for processing a filed insurance claim and to automatically make decisions about the insurance claim. The one or more processing steps associated with the processing of an insurance claim may also be configured as one or more processing step objects. In one embodiment, a display screen may be associated with a processing step. The display screen may also be represented as an object. Each display screen object may include a property to point to a previous display and another property to point to a next display screen. Each property, e.g. the next display pointer on a display screen object, may be changed dynamically by using methods associated with the display screen object. One display screen object may serve as the starting point for processing insurance claims. In one embodiment, the starting point for processing insurance claims may include acquiring an insurance claim identification number from an IC system user.

In one embodiment, during the processing of an insurance claim, a business rule and/or an IC system user input may determine that the insurance claim processing needs the execution of a formula, or take additional steps or execute tasks to continue the processing of the claim. The IC system user may provide inputs to the insurance claims processing program 60 at any display screen associated with a step. The insurance claim processing software may dynamically modify the number of steps and/or the sequence of their execution to complete the claim processing transaction. An IC system user working at a client system may then iterate through the claim processing steps and assess a bodily injury damages associated with the insurance claim.

In one embodiment, upon startup, the program 60 may provide a graphical user interface to display claims processing related information on display screen 50. It may collect user inputs, entered by using user input devices 52, and associated with insurance claims. It may process the user inputs, access an insurance database 40, use the contents of the insurance database 40 to estimate the insurance claim, and store it in memory 30 and/or insurance database 40. The program 60 may display a value of the estimated insurance claim on display screen 50. A user may view the display of the estimated insurance claim on display screen 50, and may interactively make modifications, additions, and deletions to the estimated insurance claim.

System 20 may also include one or more user input devices 52, such as a keyboard, for entering data and commands into the insurance claim program 60. It may also include one or more cursor control devices 54 such as a mouse for using a cursor to modify an insurance claim viewed on display screen 50. In response to the updating of the estimated insurance claim, the insurance claim program 60 may store the updated insurance claim in the insurance database 40.

Figure 1B:
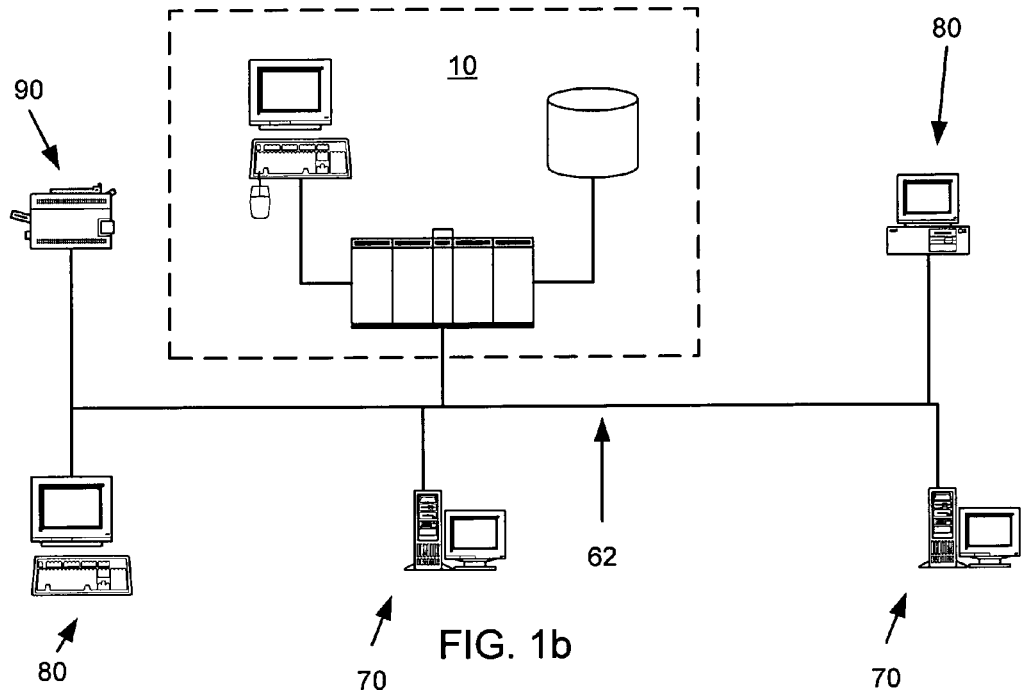
FIG. 1b illustrates one embodiment of a networked insurance claim processing system.

FIG. 1*b*: One Embodiment of a Networked Insurance Claim Processing System

FIG. 1*b* illustrates one embodiment of a networked system, configured for processing insurance claims. In this embodiment, the system is shown as a client/server system with the server systems and client systems connected by a network 62. Network 62 may be a local area network or wide area network, and may include communications links including, but not limited to: Ethernet, token ring, Internet, satellite, and modem. Insurance claims processing system 10 as illustrated in FIG. 1*a* may be connected to network 62. The insurance claims processing system software and insurance database 40 may be distributed among the one or more servers 70 to provide a distributed processing system for insurance claim transactions. In other words, an insurance claim processing transaction being processed by the insurance claim processing system may be routed to any server based upon the workload distribution among servers 70 at the time of the transaction. Insurance claim processing system servers 70 may be located on a local area network or may be geographically dispersed in a wide area network.

One or more client systems 80 may also be connected to network 62. Client systems 80 may reside at one or more claim processing units within the insurance company. In a wide area network, client systems 80 may be geographically dispersed. Client systems 80 may be used to access insurance claim processing system servers 70 and insurance database 40. An insurance claim-processing employee may use a client system 80 to access the insurance claim processing system and execute insurance transactions. An employee may also use a client system 80 to enter insurance claim inputs into the insurance claim processing system. One or more printers 90 may also be connected to network 62 for printing documents associated with insurance claim transactions.

Various embodiments further include receiving or storing instructions and/or data implemented in accordance with the description herein upon a carrier medium. Suitable carrier media include memory media or storage media such as magnetic or optical media, e.g., disk or CD-ROM, as well as transmission media or signals such as electrical, electromagnetic, or digital signals, conveyed via a communication medium such as networks and/or a wireless link.

Figure 2:
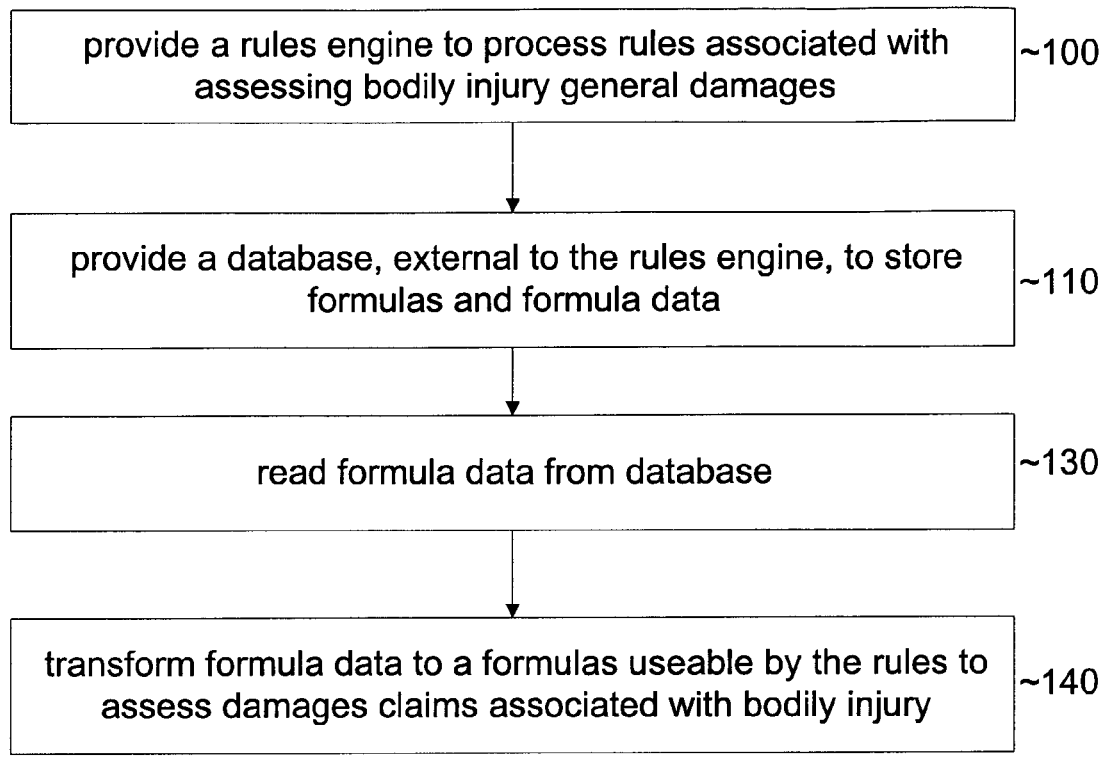
FIG. 2 illustrates a flow chart to transform formula data to formulas for assessing bodily injury damages claims according to one embodiment.

FIG. 2: A Flow Chart to Transform Formulas Data to Formulas for Assessing Bodily Injury Damages Claims According to One Embodiment FIG. 2 illustrates one embodiment of a method to transform formula data to formulas for assessing bodily injury damages claims according to one embodiment. In step 100, the user or the administrator of the insurance claim processing system 20 provides a rules engine, which is capable of processing rules and operating on formulas associated with assessing bodily injury damages claims. As used herein, a "rules engine" may include an expert system which is operable to produce an output as a function of a plurality of rules. A rules engine, in one embodiment, may include an expert computer system which utilizes and builds a knowledge base developed in the form of business rules and/or formulas to assist the user in decision-making. It allows the insurance companies to capture the knowledge base of their experts by defining business rules and formulas. Once created, the expertise may be used in processing many transactions, including assessing bodily injury damages claims. The business rules and formulas enable claim-processing professionals to be assisted by industry experts to evaluate legal, medical, insurance conditions during the valuation of an insurance claim. In one embodiment, the rules engine may be developed using a commercial rule-based development tool such as PLATINUM Aion™, which is available from Computer Associates International, Inc.

Business rules, often referred to simply as rules, as executable computer program instructions. The business rules may invoke, operate or execute formulas to calculate trauma severity values associated with personal bodily injury claims. In one embodiment, the formulas include computer commands or logical instructions to achieve a certain mathematical function, i.e., assess trauma severity value for a spinal injury. Each formula, in one embodiment, may include a function operating on one or more inputs to compute one or more outputs. In another embodiment, the formulas may include a plurality of functions operating on one or more inputs to compute one or more outputs. In one embodiment, the function may be mathematical such as add, subtract, divide, etc. In another embodiment, the function may be based on custom algorithms, for example an algorithm to calculate phantom pain associated with bodily injuries. In one embodiment, the insurance claim processing system may include several formula types, wherein each formula may be specified by a unique function. The formulas may be invoked, operated, executed or fired, under the control of the business rules. Only the pertinent formulas, i.e., a subset of all the available formulas, are typically be selected and executed for processing a specific bodily injury damages claim.

In step 110, the user or the administrator of the insurance claim processing system 20 provides a database 40, which is external to the rules engine, and is capable of storing and/or retrieving information associated with insurance claim processing. As used herein, the term "external" means that the database is separate from the rules engine. The type of information stored and/or retrieved may include, but not be limited to, business objects, tables, formulas, software source code, executable software, etc. In one embodiment, the database may be relational. In another embodiment, the database 40 may be an object-oriented database.

In one embodiment, the database 40 may include a plurality of tables, which may be accessed by a translator program, also referred to as an application program, to transform, create, generate, or instantiate the data stored in the tables into formulas. In one embodiment, the database may include a plurality of knowledge bases often storing knowledge data in the form of tables. Knowledge-bases may include, but not be limited to, data, tables, program instructions, business rules, objects, etc. The data stored in the knowledge bases may also be in the form of objects. In another embodiment, the translator program may transform data stored in tables into static instances of an object class. In one embodiment, for example, the formula data table shown by way of example in FIG. 3a includes data structured in a tabular format, i.e., a table with several rows and columns. In one embodiment, the Formulas class of objects may include static instances wherein each static instance is a direct representation of a row or data in the formula data table. Thus the formula data table may include all the relevant information necessary to transform each row of the formula data table into a static instance of the Formula object class.

In one embodiment, the entire set of business formulas may be grouped or classified into a plurality of formula types. Each formula may have a common construction style, e.g., a function operating on one or more inputs to compute one or more outputs. In one embodiment, there may be several hundred pre-defined formulas types. New formula types to meet user requirement may also be created and added to the existing formula type list or table. Data included in the example formulas data table shown in FIG. 3a may typically include information necessary to create a static instance of the Formula object class. The formula data may include a plurality of entries in a table in a database, and the formula data may include a formula identifier 300, a sequence number 310, a section description, a page identifier, a prompt identifier, an answer identifier, a mathematical function or operation 320, a numeric value 330, and other suitable elements.

In step 130, the translator program initiates the transformation of data stored in the formula data table to formulas i.e. the creation of static instances of the Formula object class, by reading the formula data. In one embodiment, methods such as KBOpen and ControlLoad may be used to open and load the formulas data table. Every knowledge base table has a corresponding object class name in the insurance claim-processing program 60. For example, the formula data knowledge base table may have a corresponding formula object class. The contents of each row are read one row at a time.

In step 140, data entry in each column of the formulas data table is used to transform, or create an instance of the formula class object in the formulas knowledge base. The Control-Load function determines which set of instances of the Formula class must first be deleted using DeleteInstances ('Formulas') and recreated via Class(Formulas).Load function.

Once created, the instance of the formulas class in the formulas knowledge-base may be invoked, operated, or executed by the business rules by using the calculate method with FormulaID and the sequence number as the parameters. In one embodiment, the calculate method gathers all of the static instances with a specified FormulaID along with a sequence number. The calculate method then interprets the operations and controls how the formula is executed. The resulting output value is used to calculate the trauma severity value.

Although not explicitly shown, Steps 130 and 140 may be repeated, in one embodiment, to read all rows of the formulas data table and transform the data to as many instances of the formulas class. On invocation or execution of the static instance, the insurance claim processing software 60 may compute a trauma severity value applicable to a specific bodily injury claim consultation transaction, and print a consultation report, which summarizes an assessment or estimate of the bodily injury general damages claim.

In one embodiment, the task of updating, modifying, or revising the formulas may be simplified. To update a formula, the user or the administrator of the insurance claim processing system 20 may update the data entries stored in the formulas data table. By executing steps 130 and 140, the instances of the formulas class may be automatically updated to reflect the changes.

In another embodiment, the task of customizing of formulas to meet specific user requirements may also be simplified. The customizing of formula data in response to business requirements results in customized formulas. To add a new formula type, the user or the administrator of the insurance claim processing system 20 may add a new instance of the formulas class and update the database 40. By executing steps 130 and 140, the formulas may be automatically customized to reflect the new changes.

Figure 3:
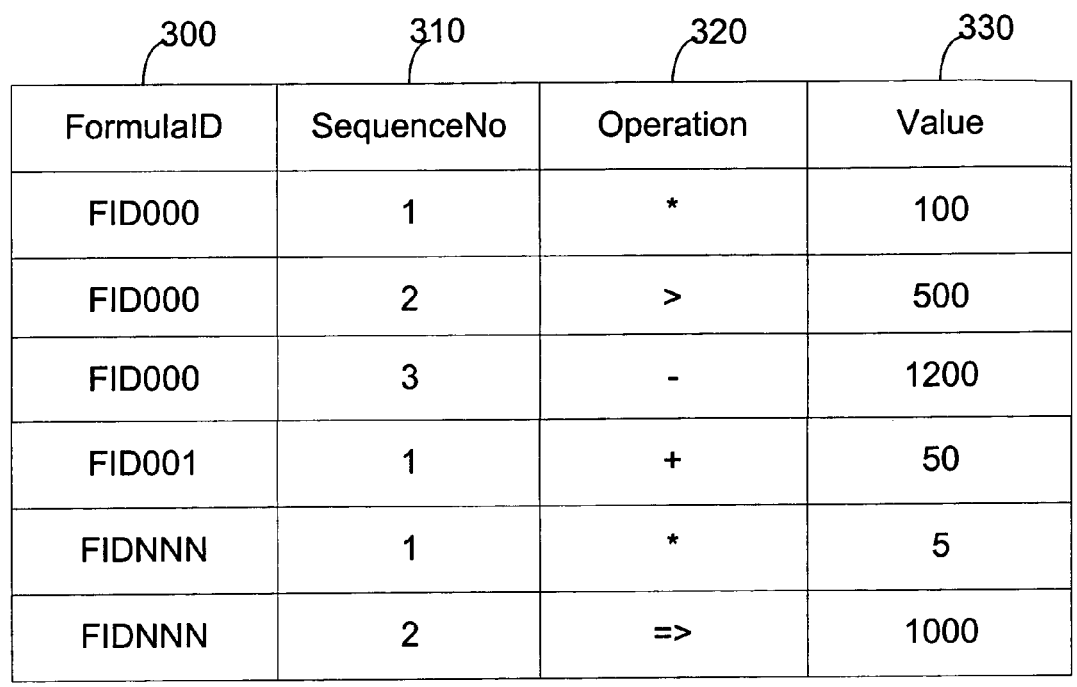
FIG. 3 illustrates data elements of a formula table according to one embodiment.

FIG. 3a: Formula Data Table in One Embodiment

FIG. 3a illustrate the tabular structure of the formula data table according to one embodiment. For purposes of example, four columns are illustrated for the table. In one embodiment, the table may comprise fewer or more columns. In one embodiment, the formula data table may be implemented in any number of ways, such as a relational database, in a variety of commercially available database management systems. The formula data table may have as many rows as may be supported by the database management system in which it is implemented. The formula data table may be accessed (e.g., searched, written to, read from, etc.) through a programming interface or standard access mechanism (e.g., SQL) which is supported by the database management system in which the formula data table is implemented.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A system comprising:
   a rules engine which is operable to assess a value of an insurance claim as a function of a plurality of rules, wherein said plurality of rules comprise formulas to assess said value of said insurance claim;
   a database which stores formula data, wherein said database is separate from said rules engine, wherein said formula data are configured to be modified as a function of business requirements of an insurance organization to form modified formula data; and
   a translator program which is operable to read said formula data from said database and transform said formula data into said formulas of said plurality of rules;
   wherein said translator program is configured to be modified as a function of business requirements of an insurance organization to form a modified translator program; and
   wherein said modified translator program is configured to read said modified formula data from said database and transform said modified formula data into a modified plurality of formulas.

2. The system of claim 1,
   wherein said formula data is stored in a tabular format in said database.

3. The system of claim 1,
   wherein said formula data comprises alphanumeric values stored in said database.

4. The system of claim 1,
   wherein said formulas are configured to be updated by updating said formula data stored in said database.

5. The system of claim 1,
   wherein said formula data comprises a plurality of entries in said database,
   wherein at least one entry comprises a formula identifier.

6. The system of claim 1,
   wherein said formula data comprises a plurality of entries in said database,
   wherein at least one entry comprises a sequence number.

7. The system of claim 1,
   wherein said formula data comprises a plurality of entries in said database,
   wherein at least one entry comprises a section description.

8. The system of claim 1,
   wherein said formula data comprises a plurality of entries in said database,
   wherein at least one entry comprises a page identifier.

9. The system of claim 1,
   wherein said formula data comprises a plurality of entries in said database,
   wherein at least one entry comprises a prompt identifier.

10. The system of claim 1,
    wherein said formula data comprises a plurality of entries in said database,
    wherein at least one entry comprises an answer identifier.

11. The system of claim 1,
    wherein said formula data comprises a plurality of entries in said database,
    wherein at least one entry comprises a mathematical function.

12. The system of claim 1,
    wherein said formula data comprises a plurality of entries in said database,
    wherein at least one entry comprises a numeric value.

13. The system of claim 1,
wherein said formulas are usable in real-time by said plurality of rules to assess the value of the insurance claim.

14. The system of claim 1,
wherein said insurance claim comprises a bodily injury claim, and wherein said value of said insurance claim comprises a bodily injury general damages value.

15. The system of claim 14,
wherein said plurality of rules use said formulas to determine a trauma severity value associated with said bodily injury claim.

16. The system of claim 1, further comprising:
a CPU;
a memory coupled to the CPU, wherein said rules engine comprises program instructions which are stored in said memory and executable by said CPU.

17. The system of claim 1,
wherein said rules comprise logical instructions for assessing said value of said insurance claim.

18. The system of claim 1,
wherein each rule comprises a premise and one or more resulting actions for assessing said value of said insurance claim.

19. The system of claim 1,
wherein each of said formulas comprises one or more inputs and one or more functions operating on said one or more inputs to compute one or more outputs.

20. A method comprising:
providing a rules engine which is operable to assess a value of an insurance claim as a function of a plurality of rules, wherein said plurality of rules use formulas to assess said value of said insurance claim;
providing a database which stores formula data, wherein said database is separate from said rules engine, wherein said formula data are configured to be modified as a function of business requirements of an insurance organization to form modified formula data;
providing a translator program, wherein said translator program is configured to be modified as a function of business requirements of an insurance organization to form a modified translator program and wherein said modified translator program is configured to read said modified formula data from said database and transform said modified formula data into a modified plurality of formulas;
reading said formula data from said database; and
transforming said formula data into said formulas usable by said plurality of rules.

21. The method of claim 20,
wherein said insurance claim comprises a bodily injury claim, and wherein said value of said insurance claim comprises a bodily injury general damages value.

22. The method of claim 21, further comprising:
assessing said value of said insurance claim as a function of said plurality of rules and said plurality of formulas by determining a trauma severity value associated with said bodily injury claim.

23. The method of claim 20,
wherein said formula data is stored in a tabular format in said database.

24. The method of claim 20,
wherein said rules engine comprises program instructions which are executable by a computer.

25. The method of claim 20,
wherein said rules comprise logical instructions for assessing said value of said insurance claim.

26. The method of claim 20,
wherein each rule comprises a premise and one or more resulting actions for assessing said value of said insurance claim.

27. The method of claim 20,
wherein said formulas data comprises alphanumeric values stored in said database.

28. The method of claim 20, further comprising:
updating said formulas by updating said formula data stored in said database.

29. The method of claim 20, further comprising:
updating said formula data in said database;
reading said updated formula data from said database; and
transforming said updated formula data into updated formulas for use by said plurality of rules.

30. The method of claim 20, further comprising:
modifying said formula data in response to business requirements of an insurance organization to form customized formula data.

31. The method of claim 30, further comprising:
modifying said formulas to form modified formulas by using said modified formula data.

32. The method of claim 20,
wherein said formula data comprises a plurality of entries in said database,
wherein at least one entry comprises a formula identifier.

33. The method of claim 20,
wherein said formula data comprises a plurality of entries in said database,
wherein at least one entry comprises a sequence number.

34. The method of claim 20,
wherein said formula data comprises a plurality of entries in said database,
wherein at least one entry comprises a section description.

35. The method of claim 20,
wherein said formula data comprises a plurality of entries in said database,
wherein at least one entry comprises a page identifier.

36. The method of claim 20,
wherein said formula data comprises a plurality of entries in said database,
wherein at least one entry comprises a prompt identifier.

37. The method of claim 20,
wherein said formula data comprises a plurality of entries in said database,
wherein at least one entry comprises an answer identifier.

38. The method of claim 20,
wherein said formula data comprises a plurality of entries in said database,
wherein at least one entry comprises a mathematical function.

39. The method of claim 20,
wherein said formula data comprises a plurality of entries in said database,
wherein at least one entry comprises a numeric value.

40. A computer readable medium comprising program instructions, wherein said program instructions are computer-executable to implement:
providing a rules engine which is operable to assess a value of an insurance claim as a function of a plurality of rules, wherein said plurality of rules use formulas to assess said value of said insurance claim;
accessing a database which stores formula data, wherein said database is separate from said rules engine, wherein said formula data are configured to be modified as a function of business requirements of an insurance organization to form modified formula data;

providing a translator program, wherein said translator program is configured to be modified as a function of business requirements of an insurance organization to form a modified translator program and wherein said modified translator program is configured to read said modified formula data from said database and transform said modified formula data into a modified plurality of formulas;

reading said formula data from said database; and transforming said formula data into said formulas usable by said plurality of rules.

41. The computer readable medium of claim 40, wherein said insurance claim comprises a bodily injury claim, and wherein said value of said insurance claim comprises a bodily injury general damages value.

42. The computer readable medium of claim 41, wherein said program instructions are further computer-executable to implement:

assessing said value of said insurance claim as a function of said plurality of rules and said plurality of formulas by determining a trauma severity value associated with said bodily injury claim.

43. The computer readable medium of claim 40,
wherein said formula data is stored in a tabular format in said database.

44. The computer readable medium of claim 40,
wherein said rules engine comprises program instructions which are executable by a computer.

45. The computer readable medium of claim 40,
wherein said rules comprise logical instructions for assessing said value of said insurance claim.

46. The computer readable medium of claim 40,
wherein each rule comprises a premise and one or more resulting actions for assessing said value of said insurance claim.

47. The computer readable medium of claim 40,
wherein said formulas data comprises alphanumeric values stored in said database.

48. The computer readable medium of claim 40, wherein said program instructions are further computer-executable to implement:

updating said formulas by updating said formula data stored in said database.

49. The computer readable medium of claim 40, wherein said program instructions are further computer-executable to implement:

updating said formula data in said database;
reading said updated formula data from said database; and
transforming said updated formula data into updated formulas for use by said plurality of rules.

50. The computer readable medium of claim 40, wherein said program instructions are further computer-executable to implement:

modifying said formula data in response to business requirements of an insurance organization to form modified formula data.

51. The computer readable medium of claim 50, wherein said program instructions are further computer-executable to implement:

modifying said formulas to form modified formulas by using said modified formula data.

52. The computer readable medium of claim 40,
wherein said formula data comprises a plurality of entries in said database,
wherein at least one entry comprises a formula identifier.

53. The computer readable medium of claim 40,
wherein said formula data comprises a plurality of entries in said database,
wherein at least one entry comprises a sequence number.

54. The computer readable medium of claim 40,
wherein said formula data comprises a plurality of entries in said database,
wherein at least one entry comprises a section description.

55. The computer readable medium of claim 40,
wherein said formula data comprises a plurality of entries in said database,
wherein at least one entry comprises a page identifier.

56. The computer readable medium of claim 40,
wherein said formula data comprises a plurality of entries in said database,
wherein at least one entry comprises a prompt identifier.

57. The computer readable medium of claim 40,
wherein said formula data comprises a plurality of entries in said database,
wherein at least one entry comprises an answer identifier.

58. The computer readable medium of claim 40,
wherein said formula data comprises a plurality of entries in said database,
wherein at least one entry comprises a mathematical function.

59. The computer readable medium of claim 40,
wherein said formula data comprises a plurality of entries in said database,
wherein at least one entry comprises a numeric value.

* * * * *